(12) United States Patent
Pelkonen

(10) Patent No.: US 7,667,959 B2
(45) Date of Patent: Feb. 23, 2010

(54) FOLDABLE ELECTRONIC DEVICE HAVING DOUBLE-AXIS HINGE AND LOCKING SPRING

(75) Inventor: Arto Pelkonen, Tampere (FI)

(73) Assignee: Nokia Corp., Espoo (FI)

( * ) Notice: Subject to any disclaimer, the term of this patent is extended or adjusted under 35 U.S.C. 154(b) by 370 days.

(21) Appl. No.: 11/314,076

(22) Filed: Dec. 20, 2005

(65) Prior Publication Data

US 2007/0151381 A1 Jul. 5, 2007

(51) Int. Cl.
*H05K 7/16* (2006.01)
(52) U.S. Cl. .............................. 361/679.27; 455/575.3; 248/923
(58) Field of Classification Search .................... 16/342, 16/337, 338, 340; 379/433.12, 433.13; 348/373, 348/794, 333.06; 361/679, 679.27; 455/575.3; 248/923
See application file for complete search history.

(56) References Cited

U.S. PATENT DOCUMENTS

| 2,458,707 | A | * | 1/1949 | Jacobs ..................... 296/97.11 |
| 4,542,903 | A | * | 9/1985 | Yokoi et al. ................... 463/31 |
| 4,734,955 | A | * | 4/1988 | Connor ........................ 16/332 |
| 4,825,395 | A | * | 4/1989 | Kinser et al. ................ 361/680 |
| 4,961,126 | A | * | 10/1990 | Suzuki ........................ 361/680 |
| 5,141,446 | A | * | 8/1992 | Ozouf et al. ................. 439/165 |
| 5,363,089 | A | * | 11/1994 | Goldenberg ............... 340/7.63 |
| 5,410,447 | A | * | 4/1995 | Miyagawa et al. .......... 361/681 |
| 5,555,157 | A | * | 9/1996 | Moller et al. ............... 361/683 |
| 5,666,694 | A | * | 9/1997 | Slow et al. .................... 16/368 |
| 5,719,799 | A | * | 2/1998 | Isashi ........................ 708/105 |
| 5,732,331 | A | * | 3/1998 | Harms ..................... 455/575.3 |
| 5,752,293 | A | | 5/1998 | Lowry et al. ................. 16/342 |
| 6,035,491 | A | * | 3/2000 | Hartigan et al. ............... 16/342 |
| 6,154,359 | A | * | 11/2000 | Kamikakai et al. .......... 361/681 |
| 6,182,330 | B1 | * | 2/2001 | Novin et al. .................. 16/341 |
| 6,263,543 | B1 | | 7/2001 | Daoud ......................... 16/342 |
| 6,349,449 | B1 | * | 2/2002 | Kuehl .......................... 16/342 |
| 6,377,444 | B1 | | 4/2002 | Price et al. .................. 361/683 |
| 6,470,532 | B2 | * | 10/2002 | Rude ............................ 16/335 |
| 7,140,074 | B2 | * | 11/2006 | Han et al. ..................... 16/366 |
| 7,319,891 | B2 | * | 1/2008 | Ting ........................ 455/575.3 |
| 7,512,426 | B2 | * | 3/2009 | Maatta et al. ............. 455/575.1 |
| 2002/0038493 | A1 | * | 4/2002 | Ko et al. ....................... 16/303 |

(Continued)

FOREIGN PATENT DOCUMENTS

FR 1 306 254 A 10/1962

*Primary Examiner*—Jayprakash N Gandhi
*Assistant Examiner*—Ingrid Wright
(74) *Attorney, Agent, or Firm*—Ware, Fressola, Van Der Sluys & Adolphson, LLP

(57) ABSTRACT

A foldable device has a hinge to allow it to be opened or closed. The hinge has two shafts separately secured to two panels of the foldable device. Each shaft has a coupling section with a recess on the shaft surface. A substantially planar spring having two curved sections is used to join the shafts through the corresponding coupling sections. Each curved section has a protruding portion on the inner diameter of the curved section. When the foldable device is in the closed position, the protruding portion in the second curved section is engaged in the recess of the second shaft, while the first curved section is disengaged from the recess of the first shaft. The foldable device can be opened toward a locking position where both protruding portions are engaged in the respective recesses. At any position, the hinge is rotated around only one of the shafts.

28 Claims, 9 Drawing Sheets

U.S. PATENT DOCUMENTS

2004/0034967 A1* 2/2004 Hsiu .......................... 16/342
2004/0091101 A1* 5/2004 Park et al. .............. 379/428.01
2004/0212956 A1* 10/2004 Kuivas et al. ............... 361/683
2004/0266239 A1 12/2004 Kurokawa ................... 439/165
2005/0122671 A1* 6/2005 Homer ...................... 361/681

* cited by examiner

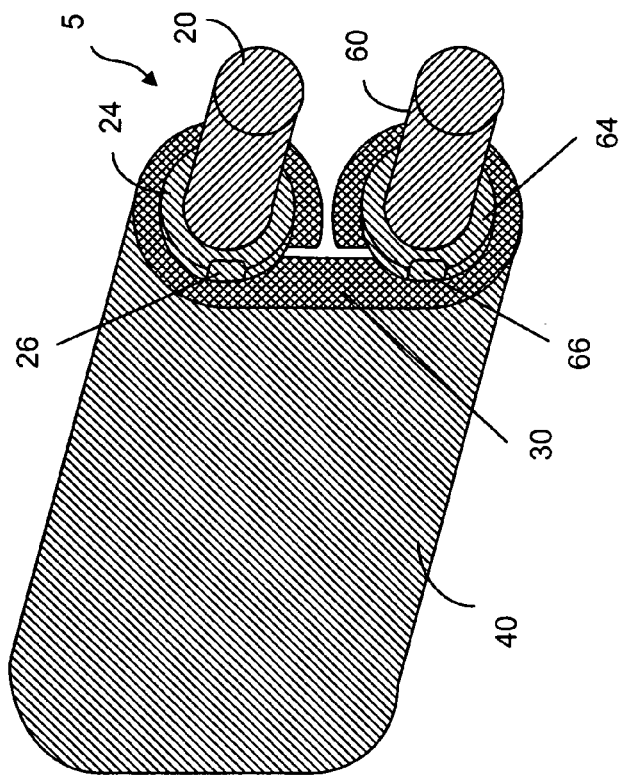
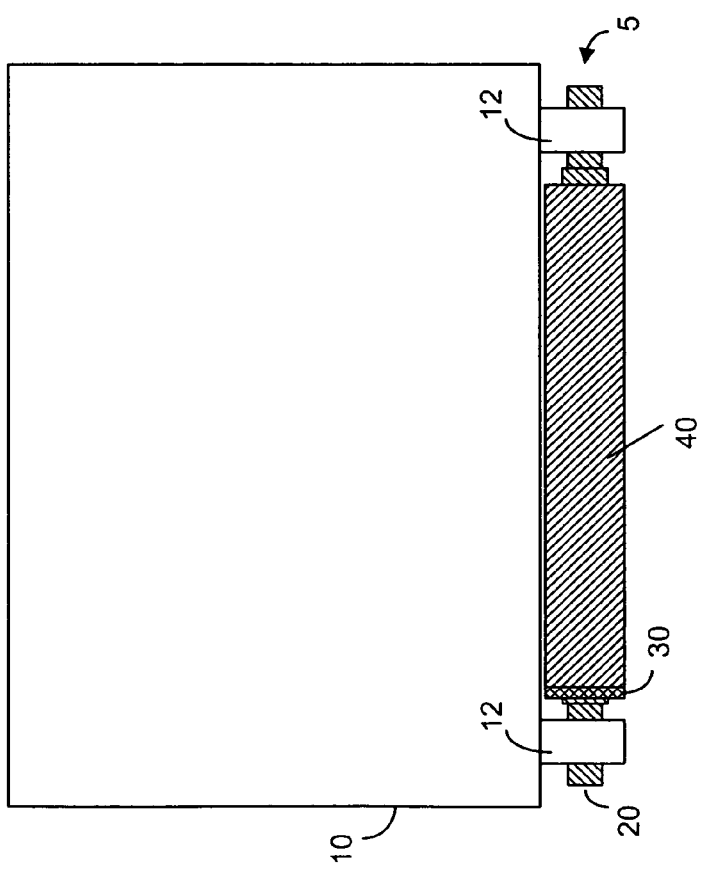
FIG. 2
FIG. 3

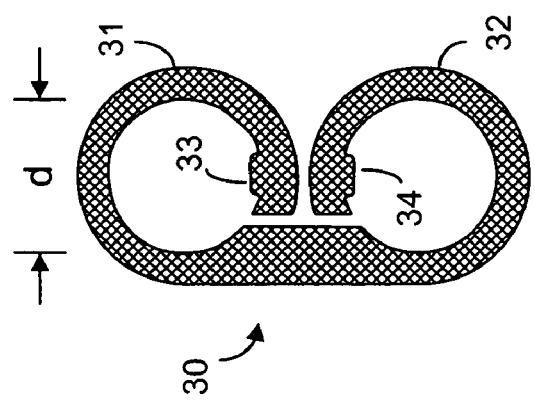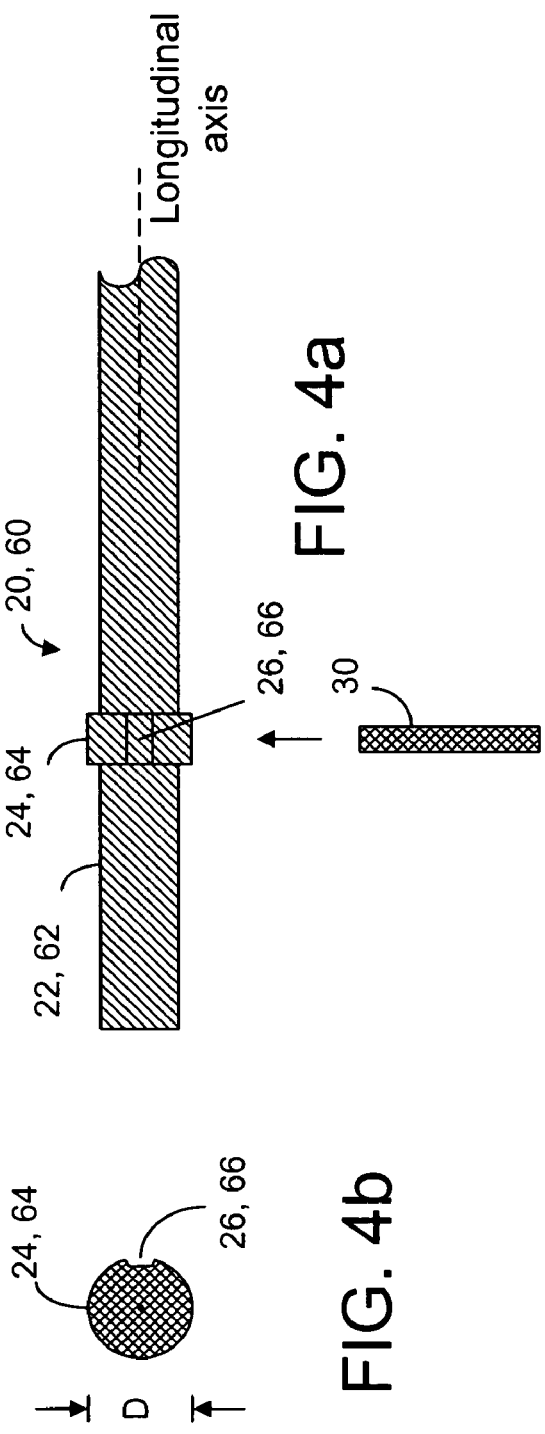

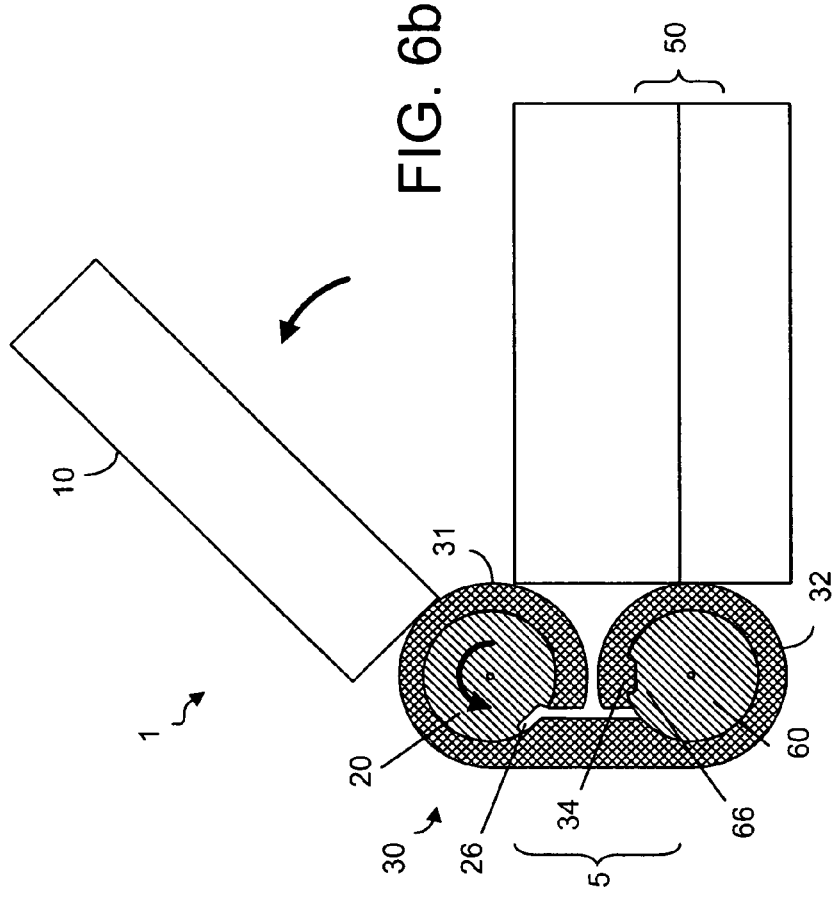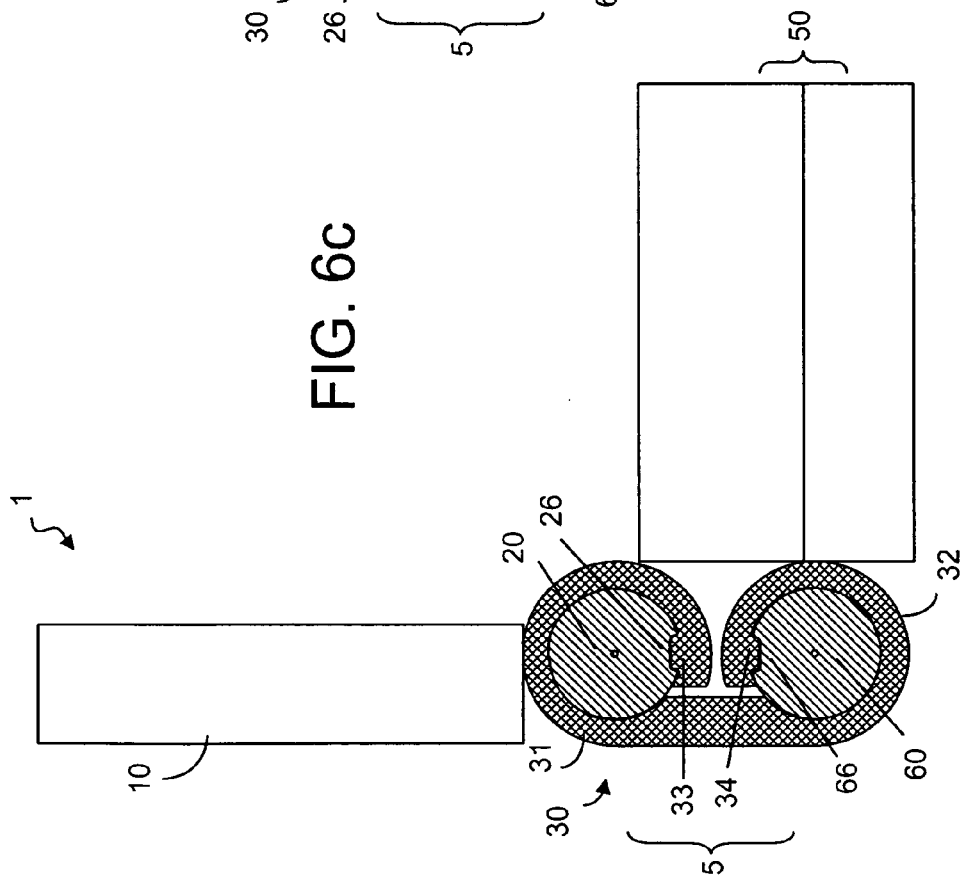

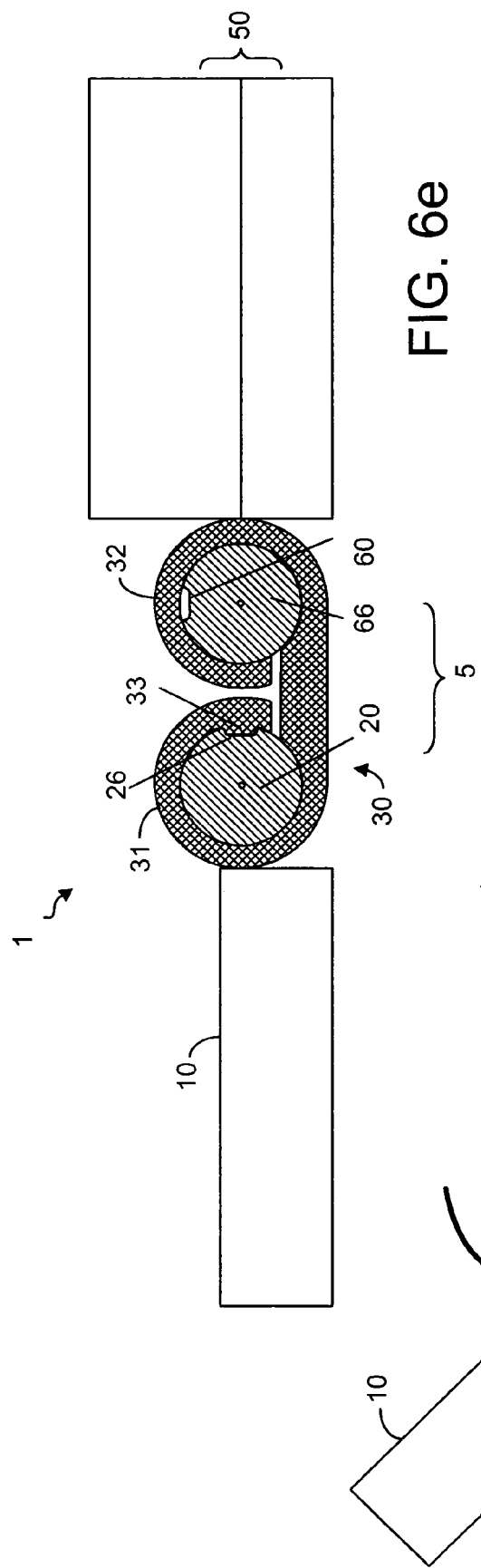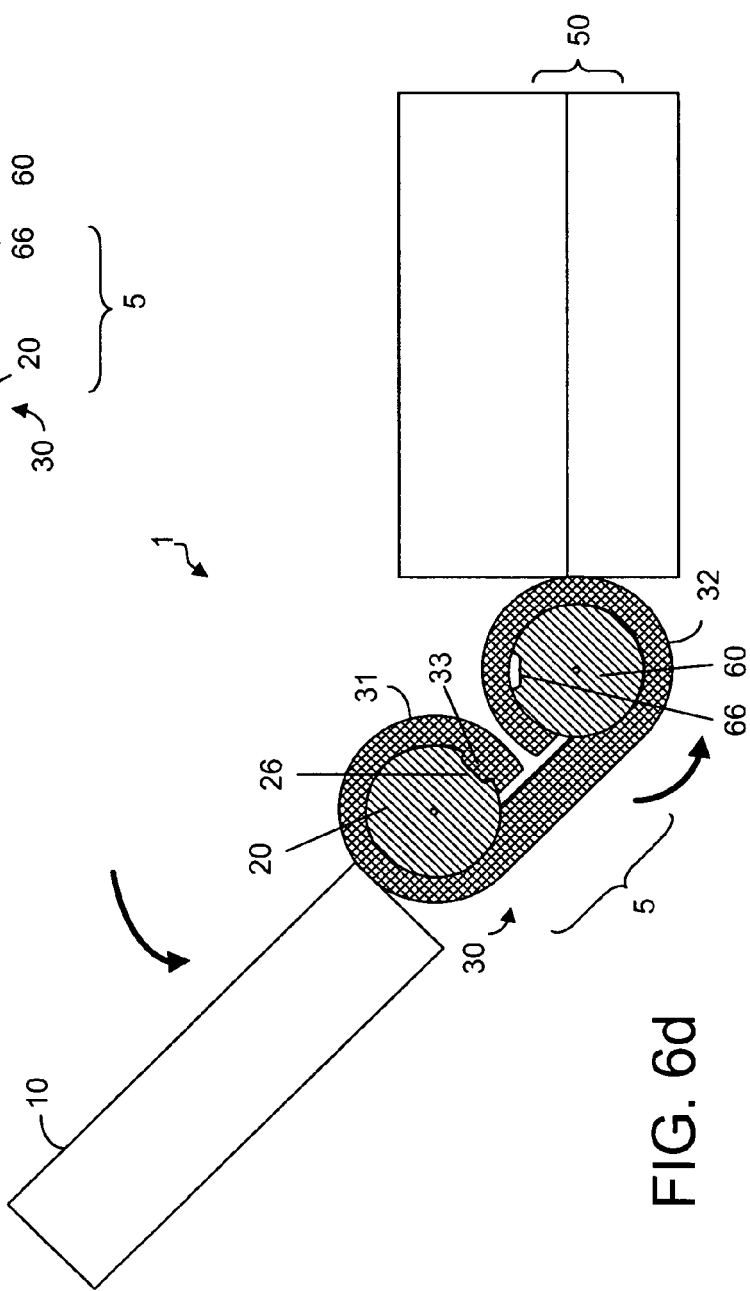

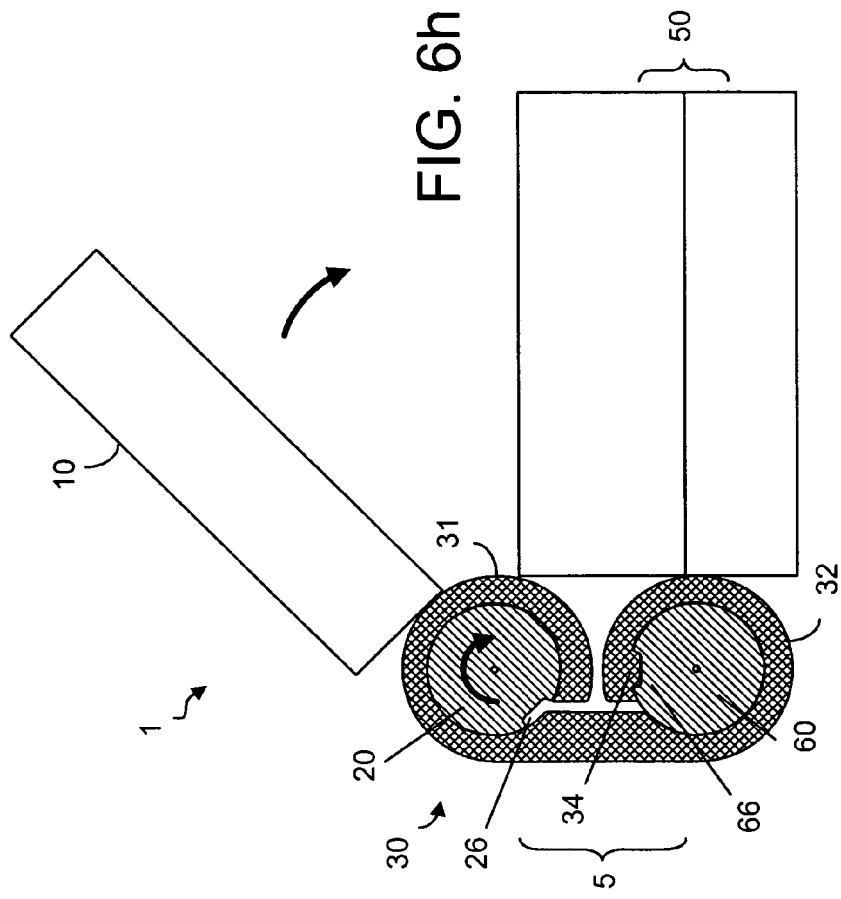
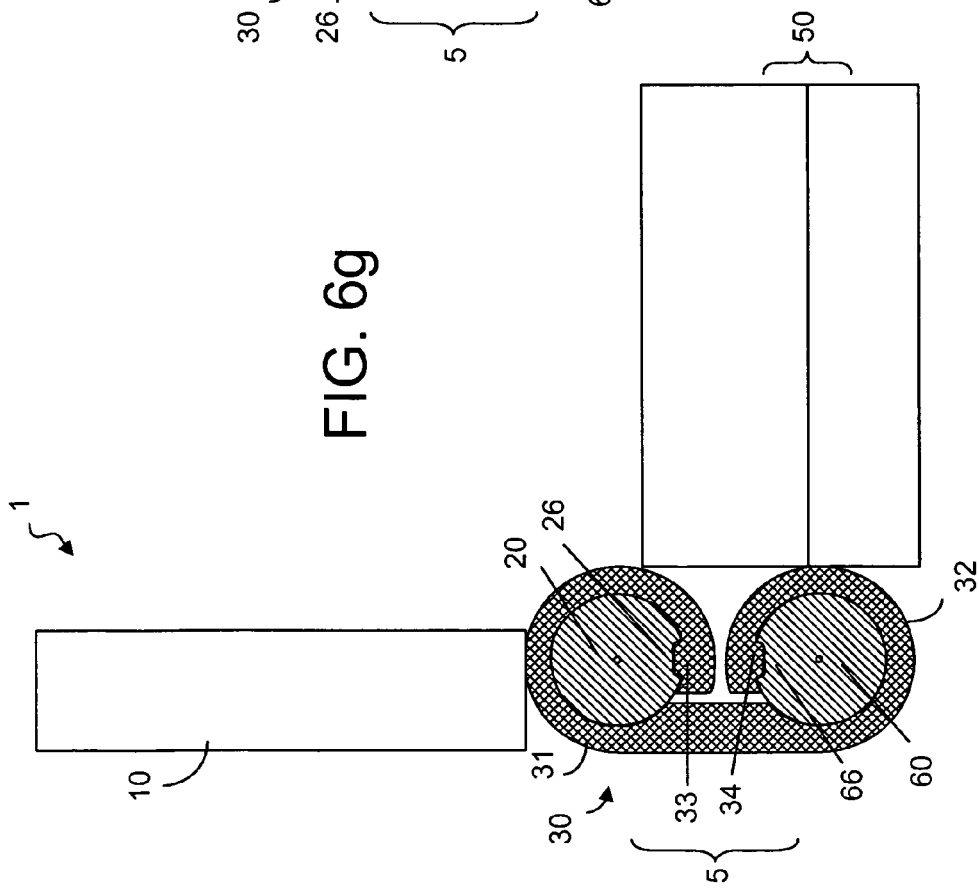

FOLDABLE ELECTRONIC DEVICE HAVING DOUBLE-AXIS HINGE AND LOCKING SPRING

FIELD OF THE INVENTION

The present invention relates generally to a foldable electronic device which can be opened to reveal two facing surfaces of two device parts and, more particularly, to a hinge for linking the device parts.

BACKGROUND OF THE INVENTION

Foldable electronic devices such as mobile phones, notebook computers, and PDAs comprise two device parts linked by a hinge. The hinge can be a single-axis construction wherein two hinge plates with coupling channels are separately connected to the device parts and a pin is inserted through the coupling channels as a pivot axis to join the two hinge plates. A single-axis hinge can also be constructed with a coil spring wrapped around a pivot pin wherein each end of the coil spring is secured to one device part. The hinge can also be a double-axis construction wherein two shafts are separately attached to the device parts and a coupling is engaged with the two shafts to allow the shafts to be used as two pivot axes. A foldable electronic device with a double-axis hinge is disclosed in Kurokawa (U.S. Patent Publication No. 2004/0266239 A1), for example. In Kurokawa, the double-axis hinge comprises two pivot shafts separately secured to two casings and a wire having a plurality of wound portions is used to connect the pivot shafts. This wire with wound portions acts like a winding spring having two spring ends, each secured to a casing.

SUMMARY OF THE INVENTION

The present invention provides a hinge having two pivot shafts to be separately secured to two device parts of a foldable electronic device. The first pivot shaft has a longitudinal axis substantially parallel to the longitudinal axis of the second pivot shaft. Each of the pivot shafts has a coupling section with a groove or recess on the shaft surface. A substantially planar spring having two curved sections is used to join the pivot shafts through the corresponding coupling sections. Each of the curved sections has an inner diameter substantially equal to the diameter of the coupling sections of the pivot shafts. An inwardly protruding portion is provided on a segment of the inner diameter of each curved section. When the foldable electronic device is in the closed position, the inwardly protruding portion in the second curved section is engaged in the recess of the second pivot shaft, while the first curved section is disengaged from the recess of the first pivot shaft. When the first curved section is not engaged in the recess of the first pivot shaft, the first curved section is slightly enlarged by a force acting on the inwardly protruding portion by the peripheral surface of the first pivot shaft. As such, the first curved section acts like a clamp gripping the first pivot shaft. When the foldable electronic device is opened to a certain opening angle, the inwardly protruding portion in the first curved section becomes engaged in the recess of the first pivot shaft. If the foldable electronic device is opened further, the second curved section becomes disengaged with the recess of the second pivot shaft. The second curved section is slightly enlarged by a force acting on the inwardly protruding portion by the peripheral surface of the second pivot shaft. As such, the second curved section acts like a clamp maintaining a tight hold on the second pivot shaft.

The foldable electronic device, according to the present invention, can be a computer, a mobile terminal, a communicator, a personal digital assistant, a video player, a music player or the like.

The present invention will become apparent upon reading the description taken in conjunction with FIGS. 1 to 7.

BRIEF DESCRIPTION OF THE DRAWINGS

FIG. 2 is a schematic representation of a plan view of the foldable electronic device in the closed position.

FIG. 3 shows a lock spring in relation to a shaft shield.

FIG. 4a illustrates part of a pivot shaft, according to the present invention.

FIG. 4b illustrates a cross section of the pivot shaft.

FIG. 5 illustrates the locking spring, according to the present invention.

FIGS. 6A to 6H illustrates the opening of the foldable electronic device, according to the present invention.

DETAILED DESCRIPTION OF THE INVENTION

Figure 1:
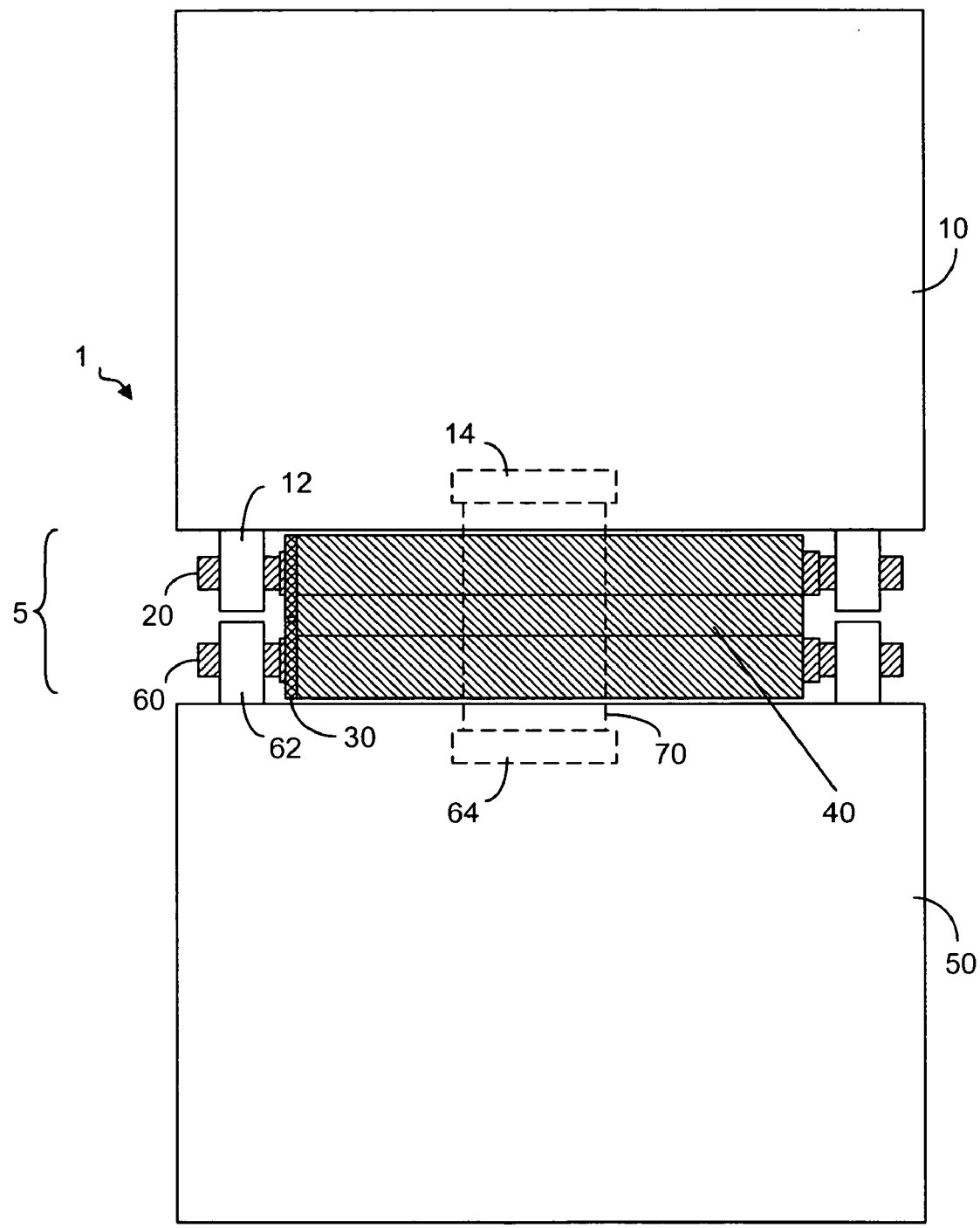
FIG. 1 is a schematic representation of a plan view of the foldable electronic device in the open position.

The present invention provides a method and a device for joining two device parts or casing of a foldable electronic device. As shown in FIG. 1, the foldable electronic device 1 comprises two device parts 10 and 50 joined by a hinge 5. The foldable electronic device 1 is shown to be in the open position. As shown in FIG. 1, the hinge 5 has two shafts served as pivot axes. The first shaft 20 is fixedly mounted on the device part 10 by shaft mounts 12. The second shaft 60 is fixedly mounted on the device part 50 by shaft mounts 52. The shafts 20, 60 are joined by a locking spring 30 and a shaft shield 40 which is stationary in relation with the lock spring 30. It is possible to provide electronic connections through a ribbon cable 70, for example, through the shaft shield 40 between a connector 14 in the device part 10 and a connector 54 in the device part 50.

FIG. 2 shows the foldable electronic device 1 in the closed position. Only the top device part 10 and the first shaft 20 are shown. FIG. 3 shows the shaft shield 40 in relation to the lock spring 30.

Part of the shafts 20 and 60 is shown in FIG. 4a. As shown, on one end of the shaft 20, 60, there is a mounting section 22, 62 and a coupling section 24, 64. A cross sectional view of the coupling section 24, 64 is shown in FIG. 4b. The shaft 20 is mechanically engaged with the shaft 60 by the locking spring 30 at the coupling sections 24, 64. As shown in FIGS. 4a and 4b, a recess 26, 66 is provided on the circumferential part of the coupling section 24, 64. The coupling section 24, 64 has a diameter D.

The locking spring 30, as shown in FIG. 5, has two curved sections 31 and 32, each having an inner diameter d substantially equal to the diameter D of the coupling section 24, 64. Each of the curved sections 31 and 32 has an inwardly protruding portion 33, 34 to be engaged with the recess 26, 66. When assembled, the first curved section 31 is engaged with the coupling section 24 of the first shaft 20, and the second curved section 32 is engaged with the coupling section 64 of the second shaft 60. It is understood that when the protruding portion 33 of the first curved section 31 is not engaged with the recess 26 of the first shaft 20, the first curved section 31 is slightly enlarged by a force acting on the inwardly protruding portion 33 by the peripheral surface of the coupling section 24 on the first shaft 20. Likewise, when the protruding portion 34 of the second curved section 32 is not engaged with the recess 66 of the second shaft 60, the second curved section 32 is slightly enlarged by a force acting on the inwardly protruding portion 34 by the peripheral surface of the coupling section 64 on the second shaft 60 (see FIG. 4a). As such, the locking spring 30 acts like a clamp to maintain a tight hold on one shaft while the other shaft is engaged with the locking spring through its recess.

Figure 6A:
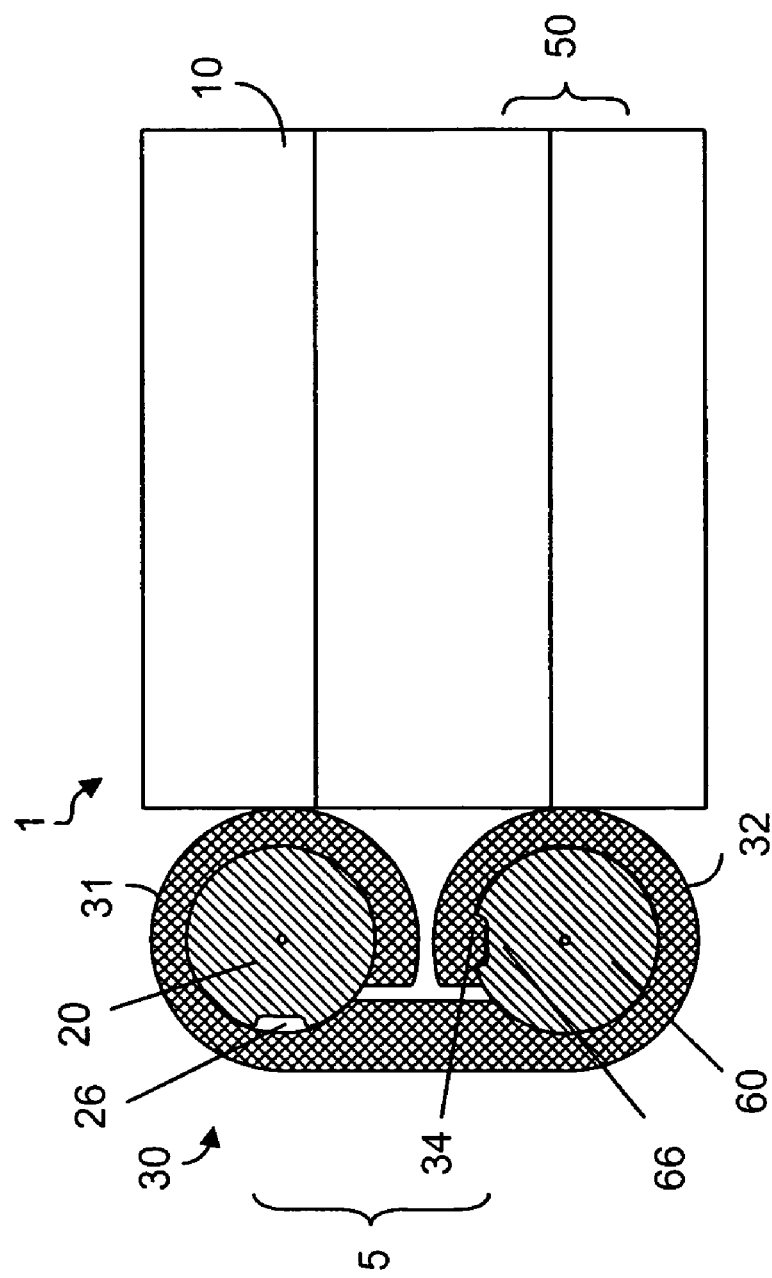

FIGS. 6A to 6H illustrate the engagement between the shafts and the locking spring when the foldable electronic device is opened from the closed position. When the foldable electronic device 1 is in the closed position, as shown in FIG. 6A, the inwardly protruding portion 34 on the second curved section 32 of the locking spring 30 is engaged with the recess 66 on the second shaft 60. However, the protruding portion 33 on the first curved section 31 is not engaged with the recess 26 on the first shaft 20. In this situation, it is easier to cause the first curved section 31 to rotate about to first shaft 20. Thus, when the foldable electronic device 1 is opened, only a relative rotational movement between the locking spring 30 and the first shaft 20 occurs. The locking spring 30 remains stationary relative to the second shaft 60, as shown in FIG. 6B.

When the angle between the first device part 10 and the second device part 50 reaches a certain angle, the protruding portion 33 on the first curved section 31 becomes engaged in the recess 26 on the first shaft 20, as shown in FIG. 6C. At this angle, the protruding portion 34 on the second curved section 32 is still engaged in the recess 66 on the second shaft 60. Thus, the foldable electronic device 1 is in a locking position.

It is designed such that the locking action between the first curved section 31 and the first shaft 20 is stronger than the locking action between second curved section 32 and the second shaft 60. For example, the height of the protruding portion 34 is smaller than the height of the protruding portion 33, and the recess 66 is shallower than the recess 26. If the foldable electronic device 1 is opened further, the locking spring 30 is caused to rotate relative to the second shaft 60 while the locking spring 30 is stationary relative to the first shaft 20, as shown in FIG. 6D. The same rotational movement can continue if so desired. As shown in FIG. 4E, the foldable electronic device can be opened such that the angle between the first device part 10 and the second device part 50 reaches 180 degrees.

Figure 6F:
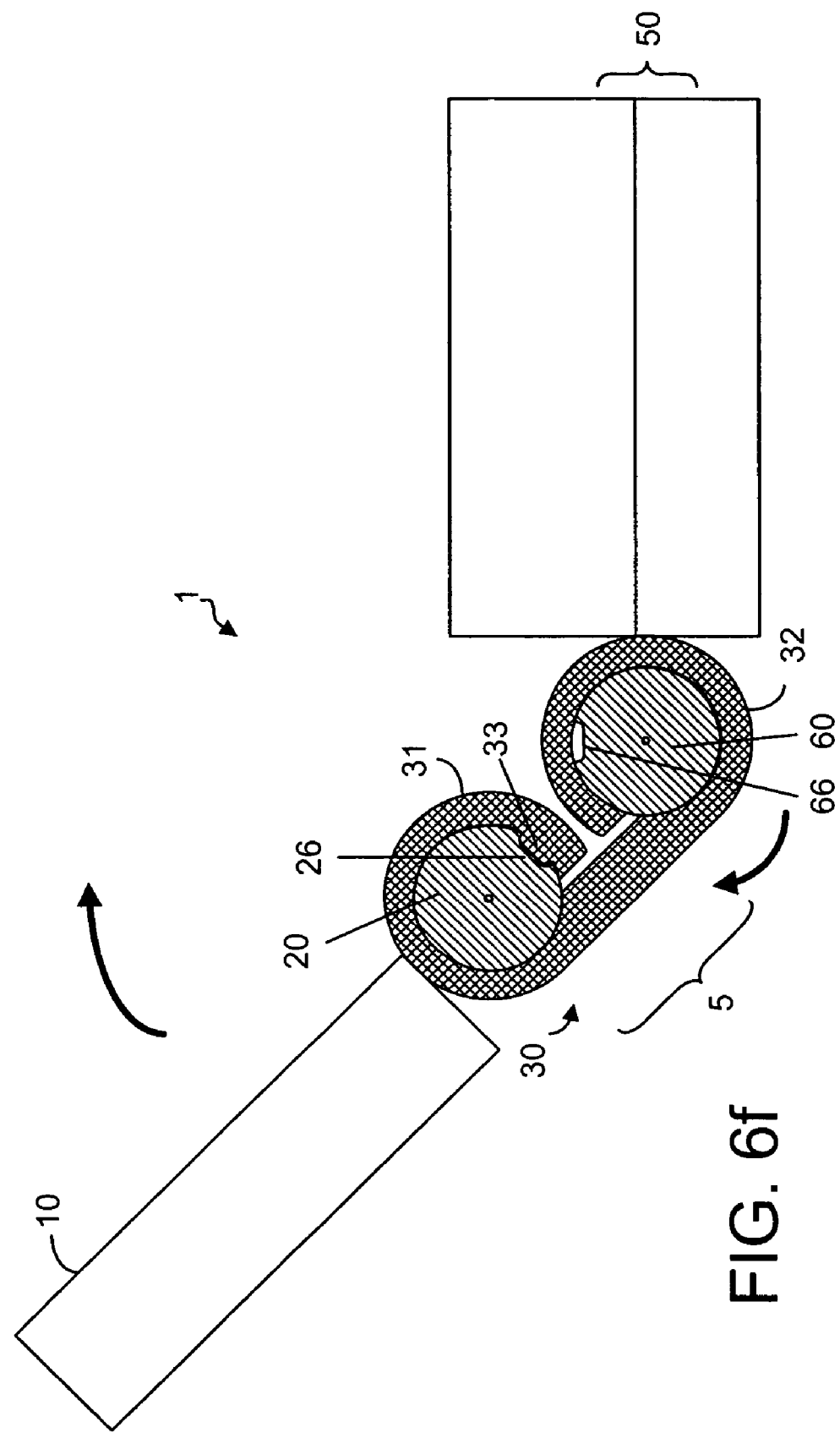

FIGS. 6F to 6H illustrate the first device part 10 of the foldable electronic device being moved in a different direction for closing the foldable electronic device. As shown in FIG. 6F, when the first device part 10 is moved in a clockwise direction for closing the foldable electronic device, it would be easier for the hinge 5 to rotate around the second shaft 60 because the protruding portion 34 is not engaged in the recess 66 until the foldable electronic device is at a latched or locking position of FIG. 6G. At this position, the protruding portions 33, 34 in relation to the recesses 26, 66 are designed such that it would require less force to rotate the hinge around the first shaft 20 in the clockwise direction, as shown in FIG. 6H.

It should be noted that when both protruding portions 33 and 34 are engaged in their corresponding recesses 26 and 66, as shown in FIG. 6C, the foldable electronic device is in a locking position. However, even when the foldable electronic device is not in the locking position, as shown in FIG. 6A, 6B, 6D, 6E, 6F and 6H, the clamping action between the locking spring 30 and one of the shafts maintains a tight hold on that shaft. As such, the foldable electronic device is reasonably stable at any opening position.

As shown in FIG. 6C, the foldable electronic device 1 is in the locking position when the angle between the first device part 10 and the second device part 50 reaches 90 degrees. However, this angle can be larger or smaller than 90 degrees depending on the placement of the protruding portion 33 on the first curved section 31 relative to the recess 26 of the first shaft. Furthermore, it is possible to provide another shorter protruding portion on the second curved section 32 so that this shorter protruding portion becomes engaged in the recess 66 when the foldable electronic device 1 is opened beyond its locking position. For example, a shorter protruding portion (not shown) on the second curved section 32 can be provided so that it becomes engaged in the recess 66 when the angle between the first device part 10 and the second device part 50 reaches 180 degrees. It is possible that the hinge 5 has only one locking spring 30 to engage with the shafts 20, 60. However, it is also possible that two or more locking springs 30 are used to engage with the shafts 20 and 60.

Figure 7:
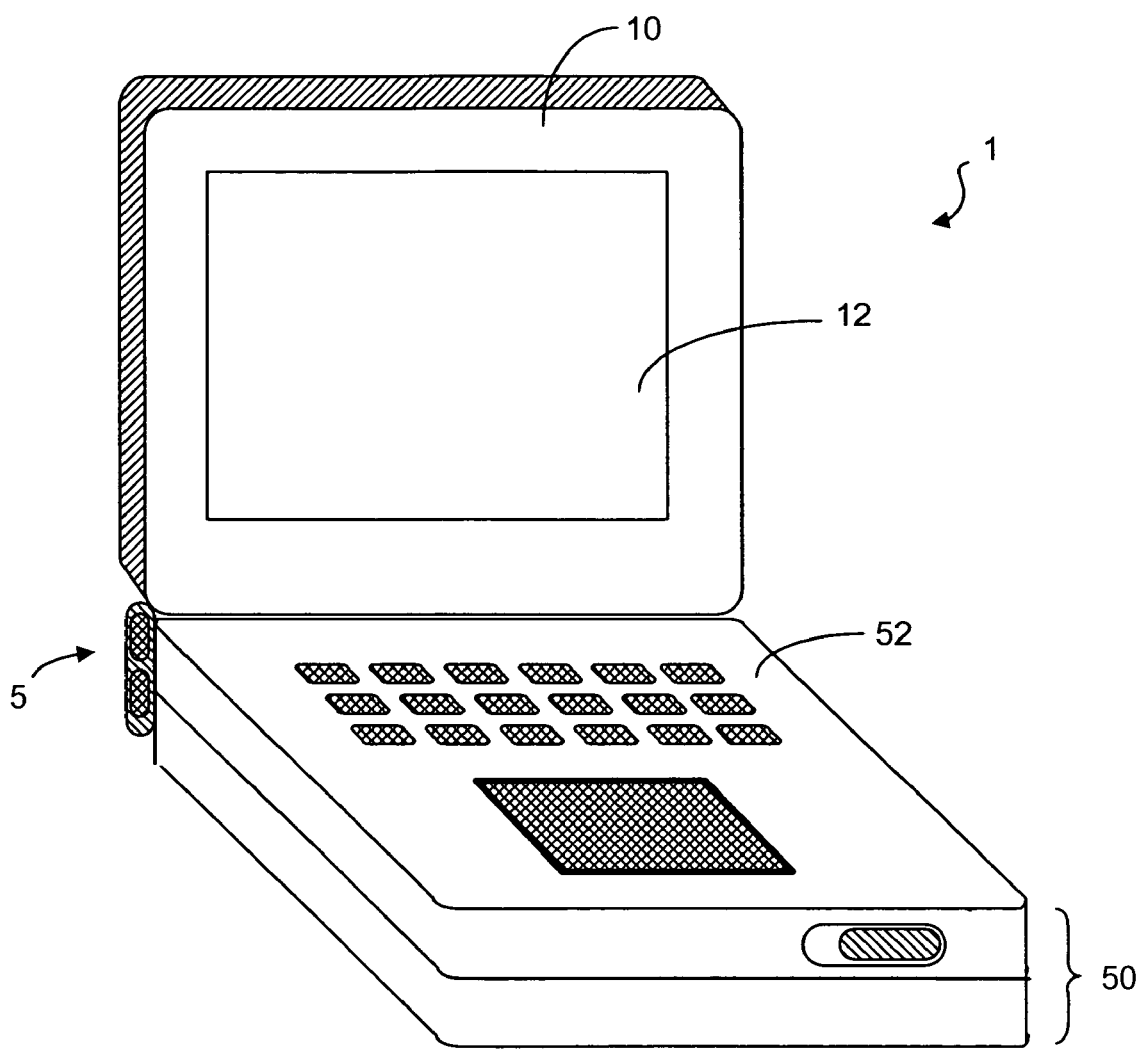
FIG. 7 illustrates the foldable electronic device in an open position.

The folding electronic device 1, according to the present invention, can be a laptop computer, a mobile phone, a communicator device, a personal digital assistant (PDA), an video player such as a portable DVD player, a gaming console to allow one or more players to player a video game, a music player, an audio-visual player or the like. As shown in FIG. 7, the folding electronic device 1 has a display 12 disposed on the first device part 10 and a keypad 52 disposed on the second device part 50. The foldable electronic device 1 may be equipped with a camera, a touch pad and other device components, depending on the functions of the foldable electronic device.

Thus, although the invention has been described with respect to one or more embodiments thereof, it will be understood by those skilled in the art that the foregoing and various other changes, omissions and deviations in the form and detail thereof may be made without departing from the scope of this invention.

What is claimed is:

1. A foldable electronic device operable at least in a first position and a second position, said foldable device comprising:

a first device part;

a second device part; and a hinge for engaging the first device part to the second device part, the hinge comprising:

a first shaft securely attached to the first device part, the first shaft having a first length defining a first shaft axis, the first shaft having a first shaft diameter, the first shaft having at least a coupling section in part of the first length, the coupling section having a first circumferential surface and a recess on the first circumference surface, the first circumferential surface having a first coupling diameter greater than the first shaft diameter;

a second shaft securely attached to the second device part, the second shaft having a second length defining a second shaft axis, the second shaft having a second shaft diameter, the second shaft having at least a coupling section in part of the second length, the coupling section having a second circumferential surface and a recess on the second circumference surface, the second circumferential surface having a second coupling diameter greater than the second shaft diameter, wherein the second shaft is positioned in relationship to the first shaft such that the second shaft axis is substantially parallel to the first shaft axis; and a lock spring having a first end and an opposing second end, the lock spring comprising:

a first curved section forming an open loop having an inner diameter substantially equal to the first coupling diameter of the first circumferential surface, the first curved section having a protruding portion protruding inwardly from the inner diameter; and a second curved section forming an open loop having an inner diameter substantially equal to the second coupling diameter of the second circumferential surface, the second curved section having a protruding portion protruding inwardly from the inner diameter, wherein the first curved section is movably engaged with the coupling section of the first shaft and the second curved section is movably engaged with the coupling section of the second shaft so as to allow the lock spring to rotate in a first rotation direction and an opposite second rotation direction relative to at least one of the first and second shafts, and wherein when the foldable device is operated in the first position, the protruding portion of the first curved section is engaged in the recess of the coupling section of the first shaft, and the protruding portion of the second curved section is located at an angular distance from the recess of the coupling section of the second shaft so as to allow the lock spring to rotate in a first rotation direction around the second shaft toward the second position of the foldable device, and when the foldable device is operated in the second position, the protruding portion of the second curved section also becomes engaged in the recess of the coupling section of second shaft.

2. The foldable electronic device of claim 1, wherein the protruding portion of the first curved section and the protruding portion of the second curved section are shaped in relation to the respective recesses such that when the protruding portion of the first curved section is engaged in the recess of the coupling section of the first shaft and the protruding portion of the second curved section is engaged in the recess of the coupling section of the second shaft, it requires less force to rotate the hinge in the first direction around the first shaft than around the second shaft.

3. The foldable electronic device of claim 2, wherein when the protruding portion of the first curved section is engaged in the recess of the coupling section of the first shaft and the protruding portion of the second curved section is engaged in the recess of the coupling section of the second shaft, it requires less force to rotate the hinge in the second direction around the second shaft than around the first shaft.

4. The foldable electronic device of claim 2, wherein when the protruding portion of the first curved section is engaged in the recess of the coupling section of the first shaft while the protruding portion of the second curved section is spaced from the recess of the coupling section of the second shaft, the open loop of the second curved section is enlarged such that the inner diameter of the open loop is larger than the second coupling diameter of the second circumferential surface and it requires less force to rotate the hinge around the second shaft than around the first shaft in either the first or the second rotation direction.

5. The foldable electronic device of claim 2, wherein when the protruding portion of the second curved section is engaged in the recess of the coupling section of the second shaft while the protruding portion of the first curved section is spaced from the recess of the coupling section of the first shaft, the open loop of the first curved section is enlarged such that the inner diameter of the open loop is larger than the first coupling diameter of the first circumferential surface and it requires less force to rotate the hinge around the first shaft than around the second shaft in either the first or the second rotation direction.

6. The foldable electronic device of claim 1, wherein the lock spring is substantially planar defining a plane such that the first and second curved sections are substantially located in the plane.

7. The foldable electronic device of claim 2, wherein the first device part has a first end and an opposing second end for attaching the first shaft, and the second device part has a first end and an opposing second end for attaching the second shaft, and wherein when the foldable device is operated in the first position, the first end of the first device part is adjacent to the first end of the second device part.

8. The foldable electronic device of claim 7, wherein the foldable device is operated in the second position, the first end of the first device part is spaced from the first end of the second device part.

9. The foldable electronic device of claim 8, wherein
the first device part has one or more device components disposed in a first plane between the first and second ends; and
the second device part has one or more device components disposed in a second plane between the first and second ends, and wherein when the foldable device is operated in the first position, the first plane is substantially parallel to the second plane.

10. The foldable electronic device of claim 9, wherein when the foldable device is operated in the second position, the first plane is substantially perpendicular to the second plane.

11. The foldable electronic device of claim 7, wherein
when the foldable device is operated in the first position, the foldable device is also operated in a closed position, and
when the foldable device is operated in the second position, the foldable device is also operated in an open position.

12. The foldable electronic device of claim 11, wherein when the foldable device is operated in the closed position, the second device part can be rotated away from the first device part toward the open position by rotating the hinge around the second shaft in the first rotation direction.

13. The foldable electronic device of claim 12, wherein when the foldable device is operated in the open position, the second device part can be moved further away from the first device part by rotating the hinge around the first shaft in the first rotation direction.

14. The foldable electronic device of claim 12, wherein when the foldable device is operated in the open position, the second device part can be moved closer to the first device part toward the closed position by rotating the hinge around the second shaft in the second rotation direction.

15. The foldable electronic device of claim 11, wherein when the foldable device is operated between the closed position and the open position, the second device part can be moved closer to the first device part toward the closed position by rotating the hinge around the second shaft in the second rotation direction.

16. The foldable electronic device of claim 1, comprising a mobile terminal.

17. The foldable electronic device of claim 1, comprising a computer.

18. The foldable electronic device of claim 1, comprising a personal digital assistant device.

19. The foldable electronic device of claim 1, comprising an audio-visual player.

20. The foldable electronic device of claim 1, comprising a gaming console.

21. A hinge for use in a foldable device having a first device part and a second device part, the hinge operable at least in a first hinge position and in a second hinge position, said hinge comprising:
a first shaft for attaching to the first device part, the first shaft having a first length defining a first shaft axis, the first shaft having a first shaft diameter, the first shaft having at least a coupling section in part of the first length, the coupling section having a first circumferential surface and a recess on the first circumference surface, the first circumferential surface having a first coupling diameter greater than the first shaft diameter;
a second shaft for attaching to the second device part, the second shaft having a second length defining a second shaft axis, the second shaft having at least a coupling section in part of the second length, the second shaft having a second shaft diameter, the coupling section having a second circumferential surface and a recess on the second circumference surface, the second circumferential surface having a second coupling diameter greater than the second shaft diameter, wherein the second shaft is positioned in relationship to the first shaft such that the second shaft axis is substantially parallel to the first shaft axis; and
a lock spring having a first end and an opposing second end, the lock spring comprising:
a first curved section forming an open loop having an inner diameter substantially equal to the first coupling diameter of the first circumferential surface, the first curved section having a protruding portion protruding inwardly from the inner diameter; and
a second curved section forming an open loop having an inner diameter substantially equal to the second coupling diameter of the second circumferential surface, the second curved section having a protruding portion protruding inwardly from the inner diameter, wherein the first curved section is movably engaged with the coupling section of the first shaft and the second curved section is movably engaged with the coupling section of the second shaft so as to allow the lock spring to rotate in a first rotation direction and an opposite second rotation direction relative to at least one of the first and second shafts, and wherein
when the hinge is operated in the first hinge position, the protruding portion of the first curved section is engaged in the recess of the coupling section of the first shaft, and the protruding portion of the second curved section is located at an angular distance from the recess of the coupling section of the second shaft so as to allow the lock spring to rotate in a first rotation direction around the second shaft toward the second hinge position, and
when the hinge is operated in the second hinge position, the protruding portion of the second curved section also becomes engaged in the recess of the coupling section of second shaft.

22. The hinge of claim 21, wherein the protruding portion of the first curved section and the protruding portion of the second curved section are shaped in relation to the respective recesses such that when the protruding portion of the first curved section is engaged in the recess of the coupling section of the first shaft and the protruding portion of the second curved section is engaged in the recess of the coupling section of the second shaft, it requires less force to rotate the hinge in the first rotation direction around the first shaft than around the second shaft.

23. The hinge of claim 22, wherein when the protruding portion of the first curved section is engaged in the recess of the coupling section of the first shaft and the protruding portion of the second curved section is engaged in the recess of the coupling section of the second shaft, it requires less force to rotate the hinge in the second rotation direction around the second shaft than around the first shaft.

24. The hinge of claim 22, wherein when the protruding portion of the first curved section is engaged in the recess of the coupling section of the first shaft while the protruding portion of the second curved section is spaced from the recess of the coupling section of the second shaft, the open loop of the second curved section is enlarged such that the inner diameter of the open loop is larger than the second coupling diameter of the second circumferential surface and it requires less force to rotate the hinge around the second shaft than around the first shaft in either the first or the second rotation direction.

25. The hinge of claim 22, wherein when the protruding portion of the second curved section is engaged in the recess of the coupling section of the second shaft while the protruding portion of the first curved section is spaced from the recess of the coupling section of the first shaft, the open loop of the first curved section is enlarged such that the inner diameter of the loop is larger than the first coupling diameter of the first circumferential surface and it requires less force to rotate the hinge around the first shaft than around the second shaft in either the first or the second rotation direction.

26. The hinge of claim 21, wherein the lock spring is substantially planar defining a plane such that the first and second curved sections are substantially located in the plane.

27. The hinge of claim 21, further comprising:
a shielding member having a shield surface, the shield surface having a first curved surface section for covering at least part of the length of the first shaft, a second curved surface section for covering at least part of the length of the second shaft, and a middle section joining the first curved surface section and the second curved surface section, wherein the shield surface is fixedly attached to the lock spring and the shield surface is dimensioned for allowing a connector cable to pass from the first device part to the second device part through the shielding member.

28. The foldable electronic device of claim 1, further comprising:
a shielding member having a shield surface, the shield surface having a first curved surface section for covering at least part of the length of the first shaft, a second curved surface section for covering at least part of the length of the second shaft, and a middle section joining the first curved surface section and the second curved surface section, wherein the shield surface is fixedly attached to the lock spring and the shield surface is dimensioned for allowing a connector cable to pass from the first device part to the second device part through the shielding member.

* * * * *

UNITED STATES PATENT AND TRADEMARK OFFICE
CERTIFICATE OF CORRECTION

PATENT NO. : 7,667,959 B2 Page 1 of 1
APPLICATION NO. : 11/314076
DATED : February 23, 2010
INVENTOR(S) : Arto Pelkonen It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 537 days.

Signed and Sealed this

Twenty-eighth Day of December, 2010

David J. Kappos
*Director of the United States Patent and Trademark Office*